Jan. 16, 1923.

C. W. DAKE.
ELECTROMAGNETIC GOVERNOR FOR MOTOR GENERATOR SETS.
FILED AUG. 20, 1919.

INVENTOR
Charles W Dake
BY
Parker & Carter
ATTORNEY

Jan. 16, 1923.

C. W. DAKE.
ELECTROMAGNETIC GOVERNOR FOR MOTOR GENERATOR SETS.
FILED AUG. 20, 1919.

INVENTOR
Charles W Dake
BY
Parker & Carter
ATTORNEY

Patented Jan. 16, 1923.

1,442,131

UNITED STATES PATENT OFFICE.

CHARLES W. DAKE, OF CHICAGO, ILLINOIS, ASSIGNOR TO PYLE-NATIONAL COMPANY, OF CHICAGO, ILLINOIS, A CORPORATION OF NEW JERSEY.

ELECTROMAGNETIC GOVERNOR FOR MOTOR-GENERATOR SETS.

Application filed August 20, 1919. Serial No. 318,652.

*To all whom it may concern:*

Be it known that I, CHARLES W. DAKE, a citizen of the United States, residing at Chicago, in the county of Cook and State of Illinois, have invented a certain new and useful Improvement in Electromagnetic Governors for Motor-Generator Sets, of which the following is a specification.

I propose to associate with an ordinary motor generator set comprising a steam turbine and a generator, an electromagnetic governing means which will respond to variations in speed or load, and open or close the steam or motive fluid valve to govern the speed of the apparatus.

In general terms, my device comprises shunt and series coils excited by the current generated by the generator end of the apparatus. So long as the load remains constant, at constant voltage, the current in the shunt and series coils will remain constant and no change in the resultant magnetic flux will occur, but as soon as the load varies from the predetermined point, a change in the resultant flux will take place because as the load goes down, the current in the series coil becomes less and so decreases the total flux. A flux will also be produced by an increase in the load.

This flux is utilized to exert a drag on a rotatable mounted collar which tends, when dragged by the flux, to rotate and close the valve against an adjustable spring tension. The lines of force are dragged around or carried around so as to affect the valve collar by the rotation of a toothed rotor on the shaft associated with the spring controlled collar and adjacent the flux generating coils.

Of course, as the load varies, the speed also will vary and as soon as the load varies, you immediately get the increased or decreased flux and on the other hand, as the rotor speed varies, the drag is intensified or lessened and so the speed variation co-operates with the load variation to affect the governing of the apparatus.

My invention is illustrated more or less diagrammatically in the accompanying drawings wherein.

Like parts are indicated by like characters in all the drawings.

Figure 1:
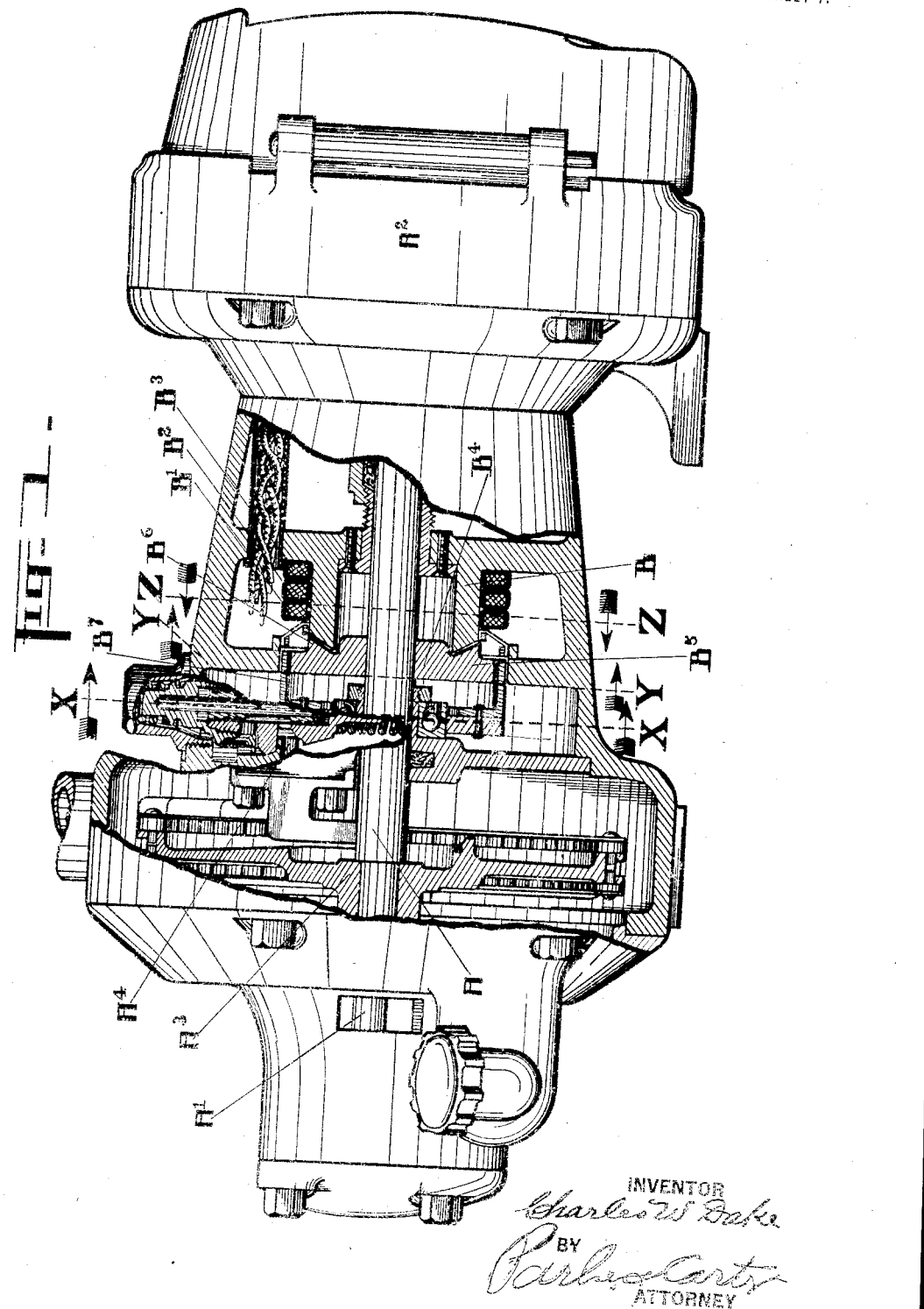
Figure 1 is a side elevation in part section with parts omitted.
Figure 2:
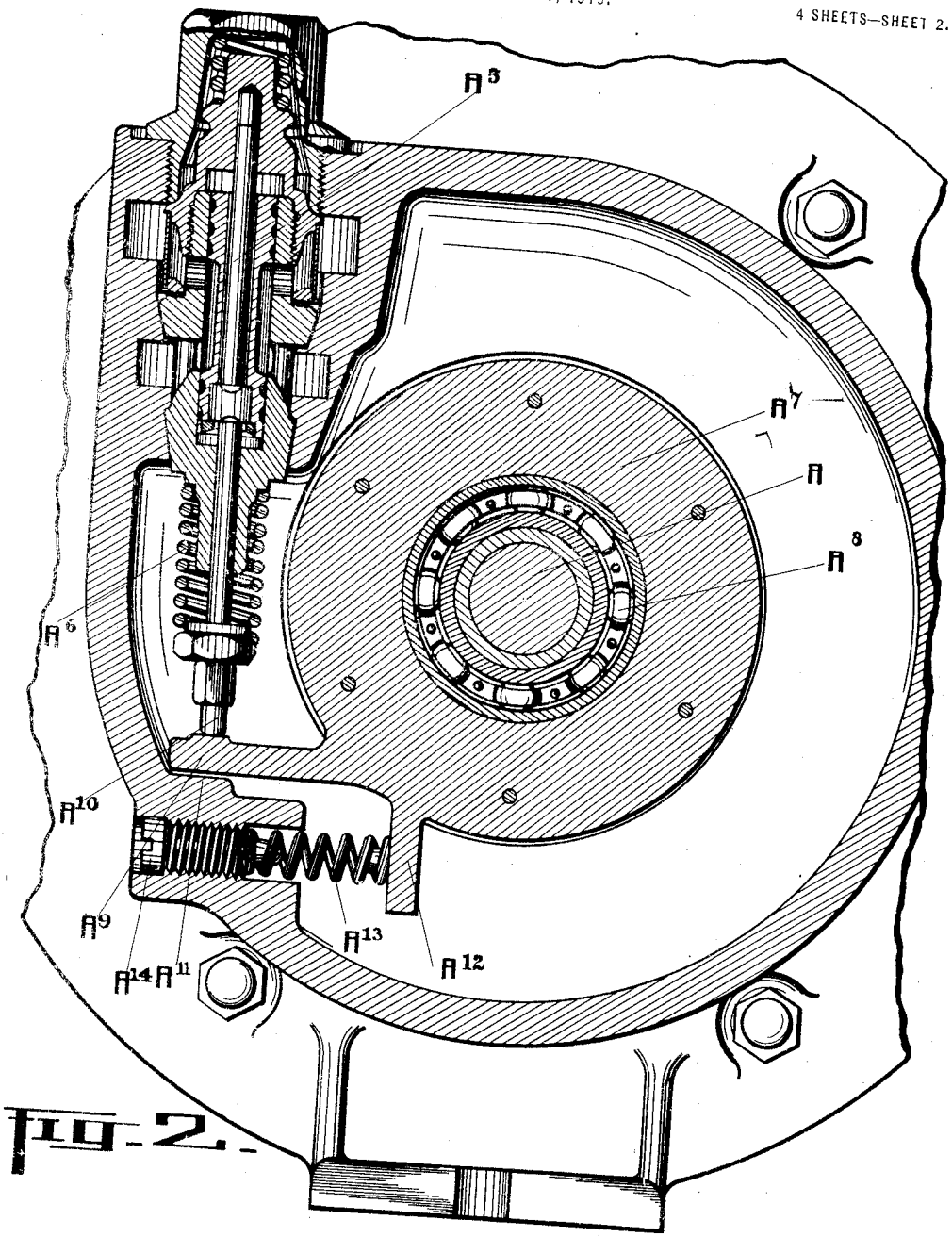
Figure 2 is a section along the line $x$—$x$ of Figure 1, in the direction of the arrows.
Figure 3:
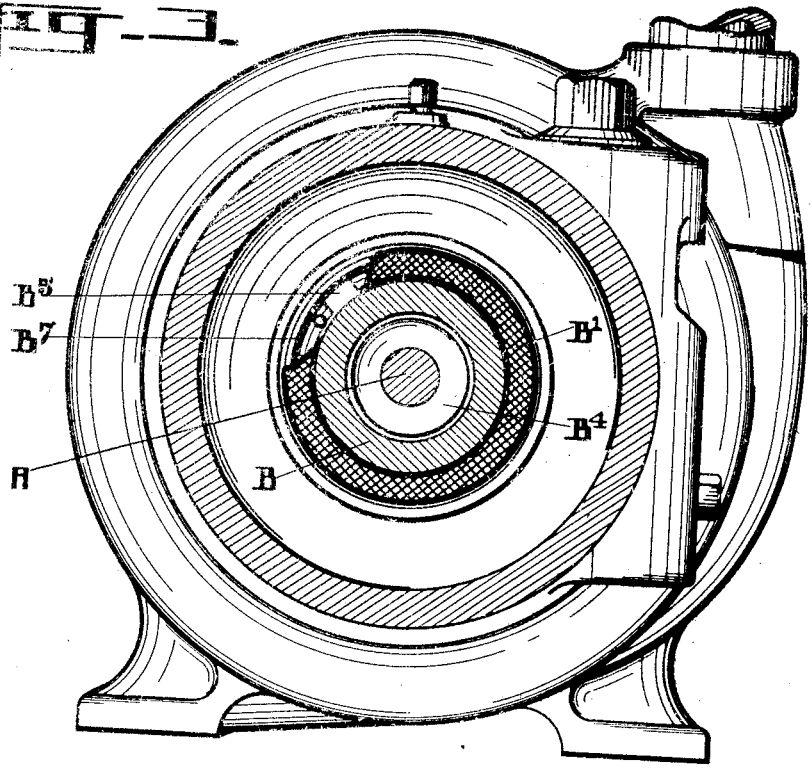
Figure 3 is a section along the line $z$—$z$ of Figure 1.
Figure 4:
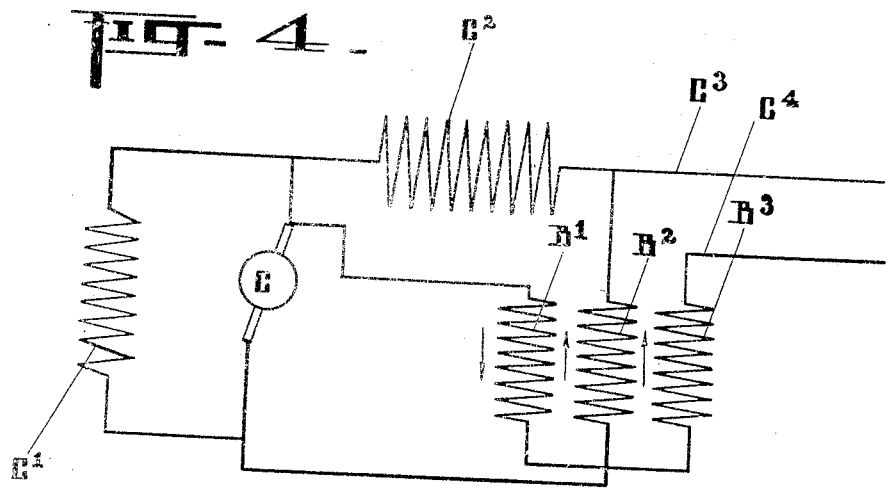
Figure 4 is a wiring diagram.
Figure 5:
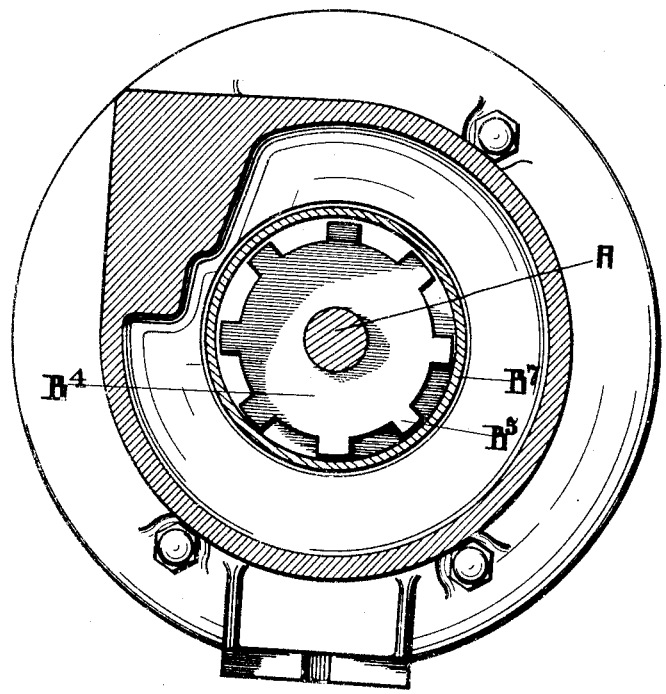
Figure 5 is a section along the line $y$—$y$ of Figure 1.

A is the main shaft supported in any suitable bearing $A^1$ as indicated. It carries at one end, an electric generator $A^2$, at the other, a turbine wheel $A^3$. Steam is supplied at the turbine wheel by any suitable source of power to a nozzle not here shown, through a steam passage $A^4$. The flow of this steam is controlled by means of a piston valve $A^5$ normally held in the open position by the spring $A^6$. A movement of the piston in the upward direction as shown, in Figure 2 would tend to close the valve. $A^7$ is a rotatable plate preferably of copper mounted on a ball bearing $A^8$ surrounding, but out of contact with the shaft A. It has a valve lever arm $A^9$ engaging the valve stem $A^{10}$, and adapted to move toward and from the limiting stop $A^{11}$. It also has a spring lever $A^{12}$ engaging a spring $A^{13}$, the pressure of which may be adjusted by the manipulation of the screw $A^{14}$.

B is a yoke. It carries coils $B^1$, $B^2$, $B^3$. $B^1$ is shunted across the brushes. $B^2$ is shunted across the terminals of the generator, and $B^3$ is in series with the load. The field of the coil $B^1$ is slightly less in ampere turns than that of the coil $B^2$ and the field of the coil $B^1$ opposes the field set up by the coils $B^2$ and $B^3$. A change in the load will cause a change in the current passing thru the coils $B^2$ and $B^3$ and hence will cause a change in the intensity of the resultant field and this will produce a flux in the yoke. This flux will be displaced by the rotation of the rotor $B^4$ with its pole pieces $B^5$, there being a magnetic connection at all times between the rotor and one end of the yoke by means of the shoulder $B^6$, and this rotation of the rotor and displacement of the flux will set up eddy currents in the copper shell $B^7$ surrounding the rotor and mounted on the rotatable plate A⁷. These eddy currents will give a resultant torque action in the same direction as the direction of rotation of the pole pieces and it is this torque action which opens and closes the steam valve.

Referring to the wiring diagram, C is the generator which in this case is shown as compound wound with a shunt field coil $C^1$ and series field coil $C^2$. The load is carried by the conductors $C^3$, $C^4$ which are connected up to the generator, and through the coils $B^1$, $B^2$, $B^3$, as indicated.

It will be evident that while I have shown in my drawings an operative device, still many changes might be made both in size, shape and arrangement of parts without departing materially from the spirit of my invention, and I wish therefore that my drawings be regarded as in a sense diagrammatic.

The use and operation of my invention are as follows:—

Starting with the parts in the position shown in the drawings, the engineer will turn the steam on at the engine. This steam will enter the apparatus and cause rotation of the motor generator set. If the normal load is coupled up to the system and if the apparatus has been properly adjusted in the shop, the steam admitted will drive the motor generator at such rate of speed as will carry the load. If the load decreases, however, and the speed then increases, as it normally would, we find that the flux set up by the series coil will be less than it normally is and a change in the total flux will take place because the system is now thrown out of electrical balance. The flux thus set up by the fact that the coils no longer counterbalance each other will be displaced or driven around by the rotor with its pole pieces which cut the lines of force. The result of this will be to set up eddy currents in the copper shell and these eddy currents, owing to the deflection of the flux or lines of force will cause or tend to cause a rotation of the shell against the adjustable spring. This rotation causes the valve to close and thus decreases the steam power and so decreases the speed to that point at which the coils balance each other or toward that point in which the coils balance each other so as to no longer set up a flux.

The coil $B^1$ is so proportioned that its ampere turns at no load are somewhat less than those of the coil $B^2$. The function of this difference is to place a positive action on the copper disc or brake tending to open the valve when the machine is loaded. The drop in the series field causes a drop in the coil $B^2$ which compensates the no load difference between $B^1$ and $B^2$ leaving the coil $B^3$ to open the valve in direct proportion to the load. However the coil $B^1$ could be dispensed with entirely and the shunt coil would simply be opposed to the series coil and when both carry their maximum flux the torque on the disc would be nil, one coil neutralizing the other and causing no flux in the brake field.

In actual service, adjustments are made by varying the tension upon the spring resisting rotation of the plate which carries the copper coil. The apparatus is originally adjusted, of course, by properly designing the capacity, ampere turns, etc., of the different shunt and series coils but this adjustment is a matter of design and is always the same for any series of machine. The inherent characteristics in a machine of a series or group are taken care of by the manipulation of the adjustable spring and co-operating screw.

It will be understood that a change in the load itself effects a change in the amount of current passing through the series coil but as soon as this change takes place, the velocity or rotation or speed of the entire apparatus changes and this causes a change both in the series coil and in the shunt coil and all these changes together cooperate to set up flux changes which changes are thus dragged to one side by the increased speed of rotation of the rotor with its pole pieces and because as the speed rises, the deflection of the lines of force is accentuated we get a kind of compound action which makes for sensitive governing, as even slight disturbances of the electrical equilibrium are multiplied and so make themselves immediately felt, thus giving peculiarly sensitive governing.

I claim—

1. A governor for motor generator sets including a rotor, comprising a plurality of shunt and series coils adapted responsive to variations in the load, to set up a magnetic flux, means responsive to the rotation of the rotor for displacing the flux and means responsive to the displacement of such flux for governing the motor.

2. A governor for motor generator sets including a rotor, comprising means responsive to variations in the load for setting up a magnetic flux, said means comprising a plurality of coils one of them in parallel, the other in series with the load and associated one with the other, means responsive to the rotation of the rotor for displacing the flux and means responsive to the displacement of such flux for governing the motor.

3. A governor for motor generator sets including a rotor, comprising means responsive to variations in the load for setting up a magnetic flux, said means comprising a plurality of coils one of them in series with the load, another shunted across the terminals of the generator, and another shunted across the brushes of the generator and associated one with the other, means responsive to the rotation of the rotor for displacing the flux, and means responsive to the displacement of such flux for governing the motor.

4. A governor for motor generator sets including a rotor, comprising means responsive to variations in the load for setting up a magnetic flux, means responsive to the rotation of the rotor for displacing the flux, said means comprising a plurality of pole pieces associated with the rotor, and means responsive to the displacement of such flux for governing the motor.

5. A governor for motor generator sets including a rotor comprising a plurality of shunt and series coils adapted responsive to variations in the load, to set up a magnetic flux, means responsive to the rotation of the rotor for displacing the flux, said means comprising a plurality of pole pieces associated with the rotor, and means responsive to the displacement of such flux for governing the motor.

6. A governor for motor generator sets including a rotor, comprising means responsive to variations in the load for setting up magnetic flux, said means comprising a plurality of coils one of them in parallel, the other in series with the load and associated one with the other, means responsive to the rotation of the rotor for displacing the flux, said means comprising a plurality of pole pieces associated with the rotor, and means responsive to the displacement of such flux for governing the motor.

7. A governor for motor generator sets including a rotor and pole pieces, comprising means responsive to variations in the load for setting up a magnetic flux, means responsive to the rotation of the rotor for displacing the flux, and means responsive to the displacement of such flux for governing the motor, said means comprising a conducting member associated with the rotor and pole pieces and an operative connection from said conducting member to the motor valve.

8. A governor for motor generator sets includig a rotor and pole pieces, comprising a plurality of shunt and series coils adapted responsive to variations in the load, to set up a magnetic flux, means responsive to the rotation of the rotor for displacing the flux, and means responsive to the displacement of such flux for governing the motor, said means comprising a conducting member associated with the rotor and pole pieces and an operative connection from said conducting member to the motor valve.

9. A governor for motor generator sets including a rotor and pole pieces, comprising means responsive to variations in the load means responsive to a magnetic flux, said means for setting up a plurality of coils one of them comprising a parallel, the other in series with the load in parallel, the other with the other, means responsive to the rotation of the rotor for displacing the flux, and means responsive to the displacement of such flux for governing the motor, said means comprising a conducting member associated with the rotor and pole pieces and an operative connection from said conducting member to the motor valve.

10. A governor for motor generator sets including a rotor and pole pieces, comprising means responsive to variations in the load for setting up a magnetic flux, said means comprising a plurality of coils one of them in series with the load, the other shunted across the brushes of the generator and associated one with the other, means responsive to the rotation of the rotor for displacing the flux, and means responsive to the displacement of such flux for governing the motor, said means comprising a conducting member associated with the rotor and pole pieces and an operative connection from said conducting member to the motor valve.

11. A governor for motor generator sets including a rotor and pole pieces, comprising means responsive to variations in the load for setting up a magnetic flux, said means comprising a plurality of coils one of them in series with the load, another shunted across the terminals of the generator, and another shunted across the brushes of the generator and associated one with the other, means responsive to the rotation of the rotor for displacing the flux, and means responsive to the displacement of such flux for governing the motor, said means comprising a conducting member associated with the rotor and pole pieces and an operative connection from said conducting member to the motor valve.

12. A governor for motor generator sets including a rotor, comprising a plurality of shunt and series coils adapted responsive to variations in the load, to set up a magnetic flux, means responsive to the rotation of the rotor for displacing the flux, said means comprising a plurality of pole pieces associated with the rotor, and means responsive to the displacement of such flux for governing the motor, said means comprising a conducting member associated with the rotor and pole pieces and an operative connection from it to the motor valve.

13. A governor for motor generator sets including a rotor and pole pieces, comprising means responsive to variations in the load for setting up a magnetic flux, said means comprising a plurality of coils one of them in parallel, the other in series with the load and associated one with the other, means responsive to the rotation of the rotor for displacing the flux, said means comprising a plurality of pole pieces associated with the rotor, and means responsive to the displacement of such flux for governing the motor, said means comprising a conducting member associated with the rotor and pole pieces and an operative connection from said conducting member to the motor valve.

14. A governor for motor generator sets including a rotor and pole pieces, comprising means responsive to variations in the load for setting up a magnetic flux, said means comprising a plurality of coils one of them in series with the load, the other shunted across the terminals of the generator and associated one with the other, means responsive to the rotation of the rotor for displacing the flux, said means comprising a plurality of pole pieces associated with the rotor, and means responsive to the displacement of such flux for governing the motor, said means comprising a conducting member associated with the rotor and pole pieces and an operative connection from said conducting member to the motor valve.

15. A governor for motor generator sets including a rotor and pole pieces, comprising means responsive to variations in the load for setting up a magnetic flux, said means comprising a plurality of coils one of them in series with the load, the other shunted across the brushes of the generator and associated one with the other, means responsive to the rotation of the rotor for displacing the flux, said means comprising a plurality of pole pieces associated with the rotor, and means responsive to the displacement of such flux for governing the motor, said means comprising a conducting member associated with the rotor and pole pieces and an operative connection from said conducting member to the motor valve.

16. A governor for motor generator sets including a rotor and pole pieces, comprising means responsive to variations in the load for setting up a magnetic flux, said means comprising a plurality of coils one of them in series with the load, another shunted across the brushes of the generator and associated one with the other, means responsive to the rotation of the rotor for displacing the flux, said means comprising a plurality of pole pieces associated with the rotor, and means responsive to the displacement of such flux for governing the motor, said means comprising a conducting member associated with the rotor and pole pieces and an operative connection from said conducting member to the motor valve.

17. A governor for generators and the like driven by a prime mover, in combination, a driven shaft, a member carried thereby, pole pieces on said member, a shell enclosing said member and connected to control means for said prime mover, a plurality of inductively associated coils in circuit with said generator and the line, one of said coils being shunted across the brushes of the generator another across the terminals of the generator, and another in series with the load, whereby a change in load causes a resultant flux from said coils to rotate said shell and actuate said control means.

In testimony whereof, I affix my signature in the presence of two witnesses this 15th day of August, 1919.

CHARLES W. DAKE.

Witnesses:
MINNIE M. LINDENAU,
MILDRED H. MACKE.